United States Patent [19]

Taskovic

[11] Patent Number: 4,545,592
[45] Date of Patent: Oct. 8, 1985

[54] ADJUSTABLE WIDTH LUGGAGE CARRIER APPARATUS

[76] Inventor: Boris Taskovic, 10226 Ave. "L", Chicago, Ill. 60617

[21] Appl. No.: 547,979

[22] Filed: Nov. 2, 1983

[51] Int. Cl.⁴ .............................................. B62B 3/02
[52] U.S. Cl. ..................................................... 280/35
[58] Field of Search ................. 280/638, 47.13 R, 35, 280/37; 188/56; 190/18; 414/449

[56] References Cited

U.S. PATENT DOCUMENTS

| 695,368 | 3/1902 | Bigelow | 280/35 |
| 1,561,122 | 11/1925 | Stahl | 280/35 |
| 1,887,067 | 11/1932 | Pehrsson | 280/35 |
| 2,132,316 | 10/1938 | Newton | 280/35 |
| 2,670,969 | 3/1954 | Costikyan | 280/47.13 R |
| 2,696,990 | 12/1954 | Davis | 280/47.13 R |
| 2,789,828 | 4/1957 | Gary | 280/35 |
| 3,159,410 | 12/1964 | Raymond | 280/35 |
| 3,540,752 | 11/1970 | Anuskiewicz | 280/35 |
| 3,863,945 | 2/1975 | Dunstan | 280/35 |

Primary Examiner—Joseph F. Peters, Jr.
Assistant Examiner—Everett G. Diederiks, Jr.
Attorney, Agent, or Firm—Robert M. Ward

[57] ABSTRACT

The adjustable width luggage carrier of the present invention is an apparatus for supporting and towably carrying luggage of various different widths, which apparatus comprises front and rear assemblies, each of which includes an axle collar tube telescopingly engaging and interconnecting a pair of wheel axles which have wheels disposed at the distal ends thereof. The front assembly includes a slot holding means thereon which engages the slots of a pair of yoke members that overlap to form a towing yoke. The overlapped yoke members include a plurality of adjustably overlappable apertures for adjusting the width of the towing yoke member.

7 Claims, 2 Drawing Figures

ADJUSTABLE WIDTH LUGGAGE CARRIER APPARATUS

BACKGROUND OF THE INVENTION

The present invention is directed in general to carrying devices, and more particularly to an adjustable width luggage carrier apparatus for use in connection with luggage, and especially trunks, having various different widths.

In the prior art, various means were utilized for carrying trunks and luggage, the most primitive of which comprised manually carrying the luggage. As an improvement over such prior art means, various carrying devices have been proposed and/or attempted. One such device generally comprises a hand truck-like apparatus, including a generally horizontally disposed member for sliding under the luggage, and a vertical member disposed at approximately 90 degrees thereto, which vertical member bears at the upper end thereof handle means therefor and wheels at the opposite end thereof. While generally somewhat more efficient than certain other prior art devices, such structures are generally too large in size and too heavy to be easily usable and sufficiently portable for most luggage carrying applications.

Other luggage carrier devices have been proposed which devices have been lighter and generally more portable, as well as being adjustable in width. However, such devices have been relatively complex in construction and have been confined to a limited length, such that only luggage of a certain limited length could be carried therewith.

Yet other devices of various different characteristics have been proposed, but have been relatively complex and expensive to manufacture, as well as being generally non-sturdy, difficult of adjustment in use, difficult to use in towing, and/or requiring considerable physical strength in use.

The adjustable width luggage carrier apparatus of the present invention materially alleviates the above difficulties and shortcomings of prior art apparatuses.

SUMMARY OF THE INVENTION

The adjustable width luggage carrier apparatus of the present invention is directed to devices for supporting and towably carrying luggage of various different widths. The adjustable width luggage carrier apparatus of the present invention comprises a front assembly and a rear assembly, which assemblies are disposed respectively near the front and the rear of the luggage to be carried.

Both the front and rear assemblies include a pair of wheel axles, each of which bears a wheel on the distal end thereof, and the proximate ends thereof are disposed within an axle collar tube for telescoping engagement therewith to prevent the relative distance between the two wheels to be adjusted to a selected width depending on the width of the luggage to be carried.

The front assembly further includes a pair of yoke members each of which yoke members includes a slotted distal end thereof and a plurality of apertures disposed and spaced relationship at the proximal end thereof. These apertures may thus be selectively overlapped to adjust the overall combined length of the yoke members according to the width of the luggage to be carried.

The wheel axles of the front assembly further include slot holding means for engaging the slots of the yoke members to hold the distal ends thereof at a selected distance apart.

Luggage securement means, and preferably in the form of a belt or strap structure that extends around the luggage is further included. A pin means for engaging and securing the overlapping apertures of the yoke members is disposed through the apertures on the yoke members.

A towing means, such as, preferably for example, a strap is attached to the yoke means near the center thereof to permit towing of the device.

One object of the adjustable width carrier apparatus of the present invention is to provide a new and improved luggage carrier apparatus which may be utilized with luggage, and especially including trunks, having various different widths.

Another object of the adjustable width luggage carrier apparatus of the present invention is to provide an apparatus which may be inexpensively constructed of sturdy materials, and include but few movable parts, to provide an inexpensive, stable and long-lasting apparatus.

A further object of the adjustable width luggage carrier apparatus of the present invention is to provide loops upon the axles which may serve both to hold the yoke members in the selected width position and also to serve as attachment means for the luggage holding strap.

These and other objects and advantages of the adjustable width luggage carrier apparatus will become more apparent to those skilled in the art upon a reading of the following detailed description and an examination of the appended drawing, wherein like reference numerals designate like parts throughout.

DETAILED DESCRIPTION OF PREFERRED EMBODIMENTS

Figure 1:
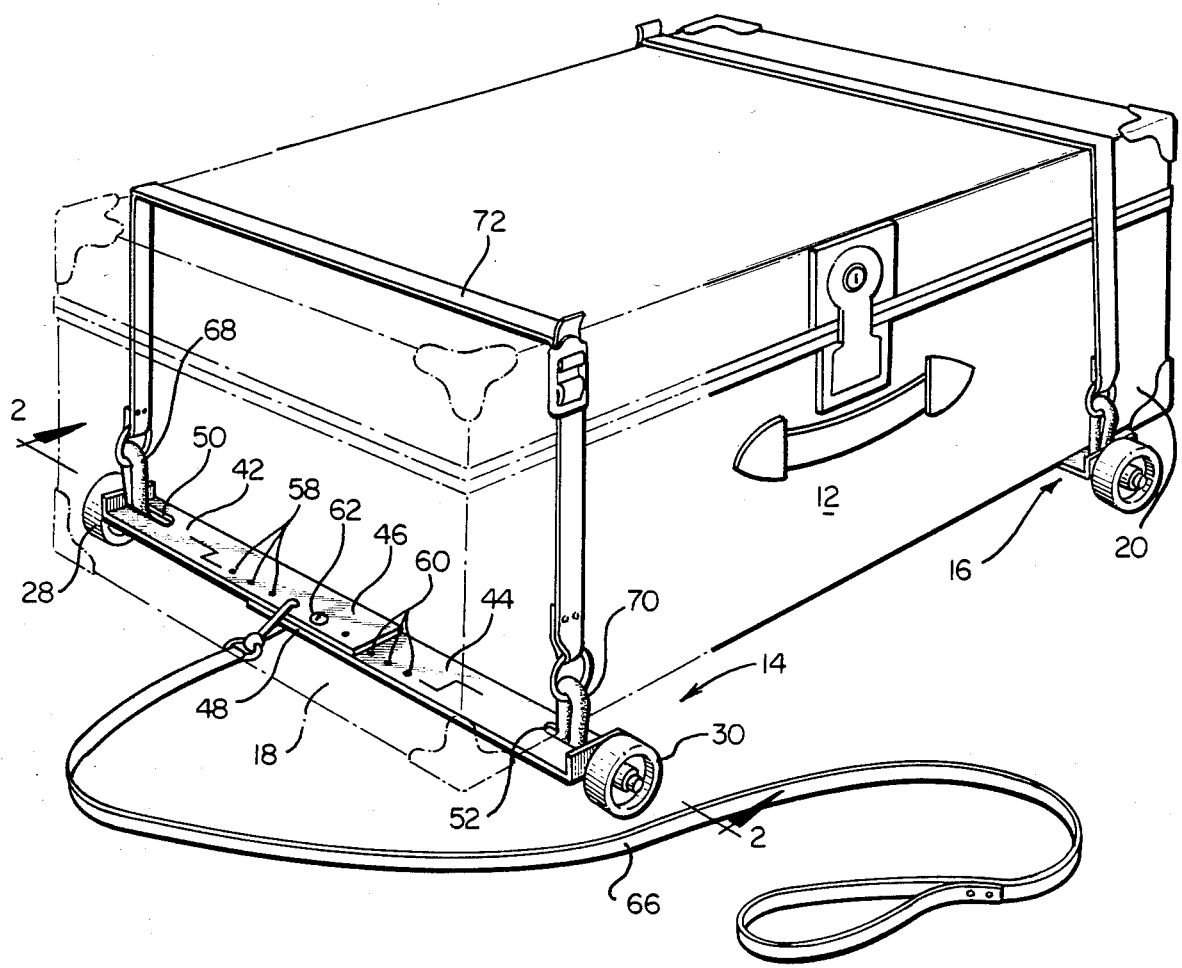
FIG. 1 is a perspective view of the adjustable width luggage carrier apparatus of the present invention showing the trunk supported thereby (in phantom lines) and particularly depicting the wheels borne by the axles, which axles contain upwardly disposed loops for simultaneously holding the yoke means and also for providing supports for the trunk surrounding strap.

The adjustable width luggage carrier apparatus of the present invention is useful in supporting and towably carrying luggage, and especially trunks, such as frequently are of different widths. The adjustable width luggage carrier apparatus of the present invention comprises a front assembly and a similar but preferably distinct rear assembly, each of which assemblies is respectively disposed near the front and rear of the luggage to be carried. Each of the front and rear assemblies has a longitudinal dimension which is disposed transversely across the bottom surface of the luggage for supporting and carrying the luggage.

Each of the front and rear assemblies has a pair of wheel axles. A pair of wheels is disposed at the distal end and rotationally borne upon the pair of axles. An axle collar tube telescopingly engages and interconnects the proximal, or center end of the wheel axles, to permit the separation distance between the pair of wheels to be adjusted to accommodate luggage of various different widths.

At least the front assembly further includes a pair of yoke members, which yoke members have an adjustable combined length generally corresponding with that of the luggage to be carried thereon. The yoke members are disposed in overlapping relationship at the proximal or central ends thereof. Each of the yoke members preferably includes a slot at the distal end thereof, and a plurality of apertures disposed in spaced relationship at the proximal end thereof. One of the apertures of each of the yoke members is selected for overlapping with one of the corresponding apertures of the opposite yoke member to adjust the overall combined length of the yoke members acording to the width of the luggage to be carried.

Each of the wheel axles of the front assembly further includes slot holding means for engaging the slots of the yoke members to hold the distal ends thereof at the appropriate selected distance apart.

Means are provided for securing the luggage to the luggage carrier. Pin means for engaging and securing the overlapped apertures of the yoke members are further provided for disposition thereinto. A towing means, preferably in the form of a strap, is provided for attachment preferably to the yoke means near the overlapped apertures thereof for towing the luggage carrier.

The adjustable width luggage carrier apparatus of the present invention may in preferred embodiments utilize as the slot holding means an upwardly disposed loop. The loop is contained on the wheel axles inwardly of and near the wheels borne on the axles. The loops are of such size and shape that the engaging slots of the yoke members may be disposed over the loops to hold the yoke members firmly in the longitudinal dimension. The yoke members are preferably permitted to flex forwardly in the transverse dimension to form a generally triangular shaped yoke for towing the luggage.

The luggage securement means of the adjustable width luggage carrier apparatus of the present invention in preferred embodiments comprises a strap which extends around the luggage to be carried and is connected to the luggage carrier by means of attachment preferably to the loops of the yoke members.

The adjustable width luggage carrier apparatus of the present invention may further preferably comprise width holding means for holding the wheel axles at the selected separation distance between the pir of wheels. Such width holding means preferably comprises a pair of elastic rings having a diameter less than that of the wheel axles. One of the elastic rings is disposed on each of the wheel axles and in contact with the end of the axle collar tube, which disposition prevents inward movement of the wheel axle relative to the axle tube collar. The pin means engaging the overlapped apertures of the yoke means in turn prevent relative outward movement of the wheel axles. The combined and cooperative effect of these structures is to provide a generally fixed width between the wheels, which width is selected to correspond to the width of the luggage to be carried.

The axle portions located on either side of the loop means are preferably disposed in straight-line relationship in preferred embodiments.

Figure 2:
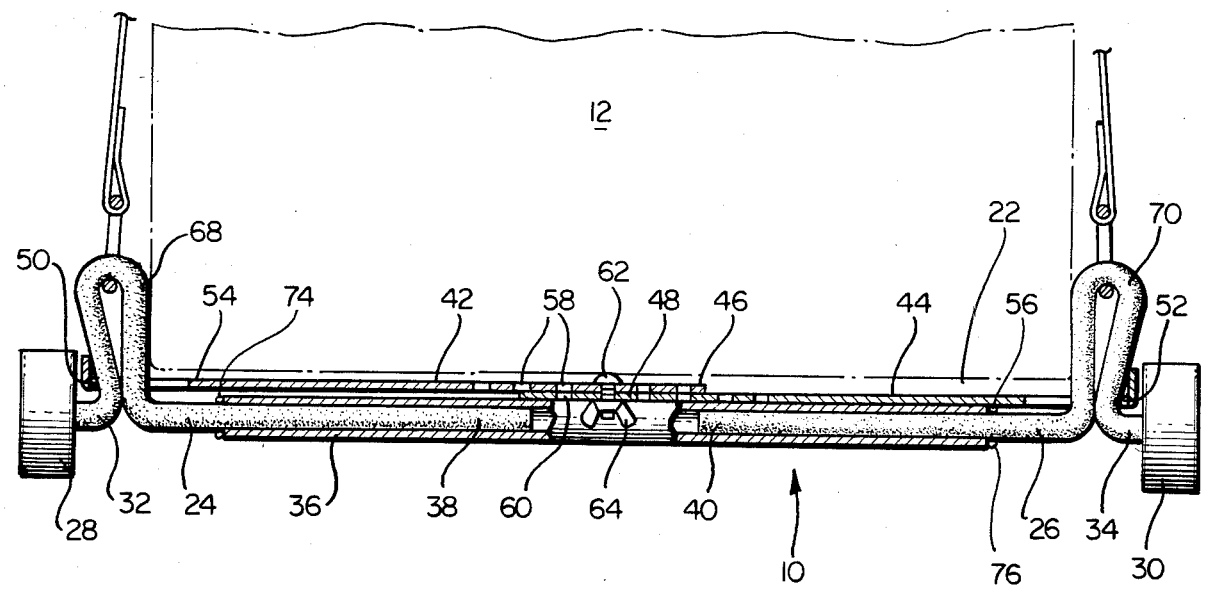
FIG. 2 is an enlarged cross-sectional view taken along line 2—2 of FIG. 1 further showing the telescoping disposition of the respective axles within the collar tube for providing lateral adjustability thereto.

Referring now to the drawing and to FIGS. 1 and 2 in particular, the adjustable width luggage carrier apparatus of the present invention generally 10 is useful in supporting and towably carrying luggage such as especially the trunk 12 such as frequently which may be of various different widths. The adjustable width luggage carrier apparatus 10 of the present invention comprises a front assembly generally 14 and a similar but preferably distinct rear assembly generally 16, each of which assemblies 14, 16 is respectively disposed near the front 18 and rear 20 of trunk 12 to be carried. For simplicity of description, only front assembly 14 will be described in great detail herein; however, it is to be understood that rear assembly 16 may be of quite similar construction. Each of front and rear assemblies 14, 16 has a longitudinal dimension which is disposed transversely across the bottom surface 22 of trunk 12 for supporting and carrying the same, as shown in FIG. 2.

Each of the front and rear assemblies 14, 16 has a pair of wheel axles 24, 26. A pair of wheels 28, 30 is disposed at the respective distal ends 32, 34 thereof and rotationally borne upon the pair of axles 24, 26. An axle collar tube 36 telescopingly engages and interconnects the proximal, or center ends respectively 38, 40 of wheel axles 24, 26 to permit the separation distance between the pair of wheels 28, 30 to be adjusted to accommodate luggage of various different widths.

At least front assembly 14 further includes a pair of yoke members 42, 44 which yoke members 42, 44 have an adjustable combined length generally corresponding with that of trunk 12 to be carried thereon. Yoke members 42, 44 are disposed in overlapping relationship at the proximal or central ends 46, 48 thereof. Each of yoke members 42, 44 preferably includes a slot 50, 52 at the distal end 54, 56 thereof, and a plurality of apertures 58, 60 disposed in spaced relationship at the proximal ends 46, 48 thereof. One of the apertures 58 of each of yoke members 42 is selected for overlapping with one of the corresponding apertures 60 of the opposite yoke member 44 to adjust the overall combined length of the yoke members 42, 44 according to the width of trunk 12 to be carried, as shown in FIG. 2.

Means are provided for securing trunk 12 to the luggage carrier 10. Pin means in the form preferably of a screw 62 and wing nut 64 for engaging and securing the overlapped apertures 58, 60 of yoke members 42, 44 are further provided for disposition thereinto. A towing means, preferably in the form of a strap 66, is provided for attachment preferably to yoke members 42, 44 near the overlapped apertures 58, 60 thereof for towing the luggage carrier 10.

Each of wheel axles 24, 26 of front assembly 14 further includes slot holding means for engaging the slots 50, 52 of yoke members 42, 44 to hold the distal ends 54, 56 thereof at the appropriate selected distance apart. The adjustable width luggage carrier apparatus 10 of the present invention may in preferred embodiments utilize as such slot holding means 24, 26 upwardly disposed loops respectively 68, 70. Loops 68, 70 are contained on wheel axles 24, 26 inwardly of and near wheels 28, 30 borne on axles 24, 26. Loops 68, 70 are of such size and shape that the engaging slots 50, 52 of yoke members 42, 44 may be disposed over loops 68, 70 to hold yoke members 42, 44 firmly in the longitudinal dimension. Yoke members 42, 44 are preferably permitted to flex forwardly in the transverse dimension to form a generally slightly triangular shaped yoke for towing the luggage as shown in FIG. 1.

The luggage securement means of the adjustable width luggage carrier apparatus 10 of the present invention in preferred embodiments comprises a strap 72 which extends around the luggage 12 to be carried and is connected to the luggage carrier 10 by means of attacement preferably to loops 68, 70.

The adjustable width luggage carrier apparatus 10 of the present invention may further preferably comprise width holding means for holding the wheel axles 24, 26 at the selected separation distance between the pair of wheels 28, 30. Such width holding means preferably comprises a pair of elastic rings 74, 76 having a diameter less than that of wheel axles 24, 26. One of the elastic rings 74, 76 is disposed on each of wheel axles 24, 26 and in contact with the end of the axle collar tube 36, which disposition prevents inward movement of wheel axles 24, 26 relative to axle tube collar 36. Bolt 62 engaging the overlapped apertures 58, 60 of yokes 42, 44 in turn prevents relative outward movement of wheel axles 24, 26. The combined and cooperative effect of these structures is to provide a generally fixed width between wheels 28, 30, which width is selected to correspond to the width of trunk 12.

The axle portions 32, 34 located on either side of loops 68, 70 are preferably disposed in straight-line relationship in preferred embodiments. Axles 32, 34 may be preferably made from steel rods. Axle collar tube 36 preferably comprises a steel tube. Wheels 28, 30 may be formed from rubber or plastic. Strap 66 is preferably a leather or nylon strap. The luggage securement means 72 is preferably a nylon strap. Elastic rings 74, 76 are preferably formed from rubber.

Wheels 28, 30 are preferably at least one and a half inches in diameter to two and one half inches in diameter, although larger wheels may be utilized. The steel rod axles 24, 26 should be at least approximately one quarter inch in diameter in order to assure the ability to handle a substantial load.

The basic and novel characteristics of an adjustable width luggage carrier apparatus of the present invention will be readily understood from the foregoing disclosure by those skilled in the art. It will become readily apparent that various changes and modifications may be made in the form, construction and arrangement of an adjustable width luggage carrier apparatus of the present invention as set forth hereinabove without departing from the spirit and scope of the invention. Accordingly, the preferred and alternative embodiments of the present invention set forth hereinabove are not intended to limit such spirit or scope in any way.

What is claimed is:

1. An adjustable width luggage carrier apparatus for supporting and towably carrying luggage of various different widths, said apparatus comprising:
   front and rear assemblies disposed respectively near the front and rear of the luggage to be carried, each said front and rear assembly having a longitudinal dimension which is disposed transversely across the bottom surface of the luggage for supporting and carrying the luggage, each said front and rear assembly having
   (i) a pair of wheel axles;
   (ii) a pair of wheels each of which wheels is rotationally borne upon one of said pair of axles;
   (iii) an axle col telescopingly engaging an interconnecting said wheel axles to permit the separating distance between said pair of wheels to be adjusted to accommodate luggage of various different widths;
   (iv) luggage securement means for securing the luggage to the luggage carrier attached to each of said front and rear assemblies;
   at least said front assembly further including a pair of yoke members having a combined length, which yoke members are disposed in overlapped relationship at one end thereof, and each of which yoke members includes a slot at the distal end thereof and a plurality of apertures disposed in space relationship at the proximal end thereof, whereby one of the apertures of each of said yoke members may be selected for overlapping to adjust the overall combined length of the yoke members according to the width of the luggage to be carried;
   each of the wheel axles of said front member including slot holding means for engaging the slot of said yoke members to hold the distal ends of the wheel axles at a selected distance apart;
   pin means for engaging and securing the overlapped apertures of said yoke members; and
   towing means for attachment to said yoke means near the overlapped apertures thereof for towing the luggage carrier.

2. The adjustable width luggage carrier apparatus of claim 1 wherein said slot holding means comprises an upwardly disposed loop contained on said wheel axles inwardly of and near the wheels borne thereon, said loop being of such size and shape that said slots of said yoke members firmly in the longitudinal dimension, and to permit the yoke members to flex forwardly in the transverse dimension to form a generally triangular shaped yoke for towing.

3. The adjustable width luggage carrier apparatus of claim 2 wherein said luggage securement means comprises a strap which extends around the luggage to be carried and is connected to carrier by means of attachment to said loops of said yoke members.

4. The adjustable width luggage carrier apparatus of claim 1 further comprising width holding means for holding said wheel axles at the selected separation distance between said pair of wheels.

5. The adjustable width luggage carrier apparatus of claim 4 wherein said width holding means comprises a pair of elastic rings having a diameter less than that of said wheel axles, and one of said pair disposed on each of said wheel axle in contact with and at each end of said axle collar tube, thereby to prevent inward movement of said wheel axles relative to said axle tube collar.

6. The adjustable width luggage carrier apparatus of claim 2 wherein the axle portions located on either side of said loop are disposed in straight-line relationship.

7. The adjustable width apparatus of claim 5 wherein said elastic rings prevent relative inward movement of said wheel axles, and said pin means engaging the overlapped apertures of said yoke means prevents relative outward movement of said wheel axle to provide a generally fixed width between said wheels.

* * * * *